Aug. 3, 1926.

L. J. JONES

AUTO WHEEL

Filed March 13, 1926

L. J. Jones Inventor

By C.A.Snow & Co.
Attorneys.

Aug. 3, 1926.  
L. J. JONES  
AUTO WHEEL  
Filed March 13, 1926
1,594,736
2 Sheets-Sheet 2
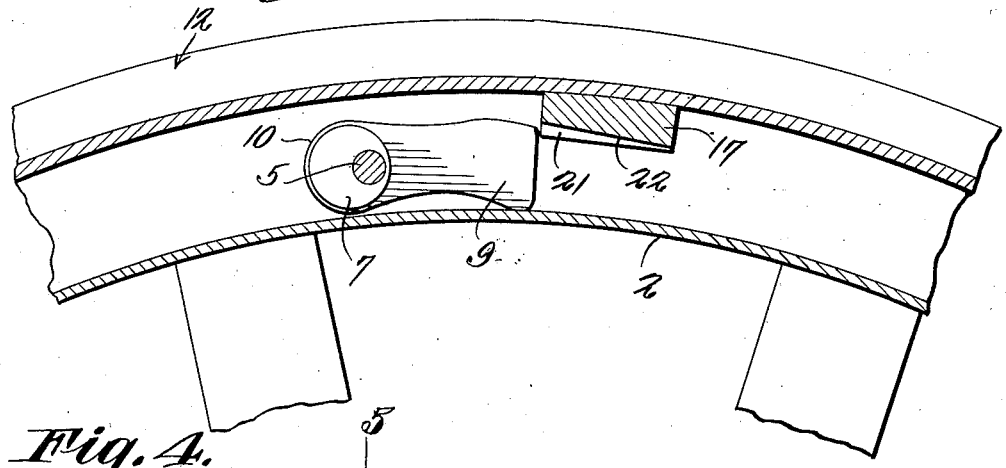
Fig. 3.
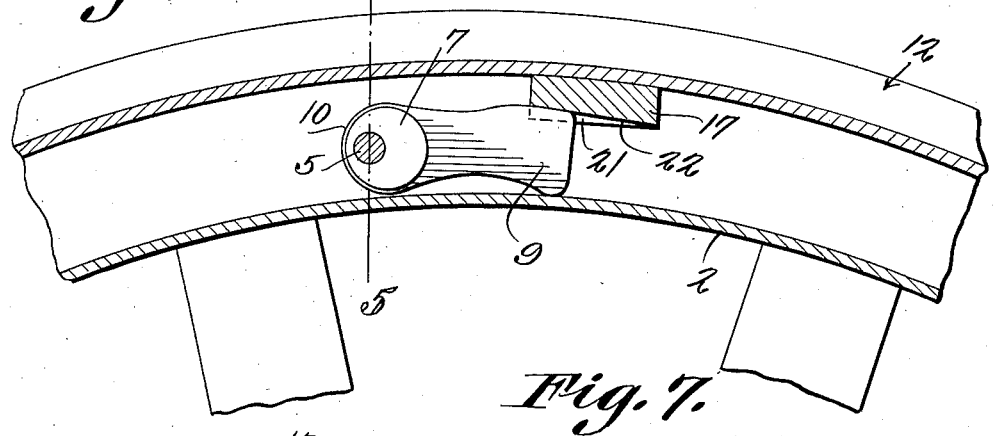
Fig. 4.
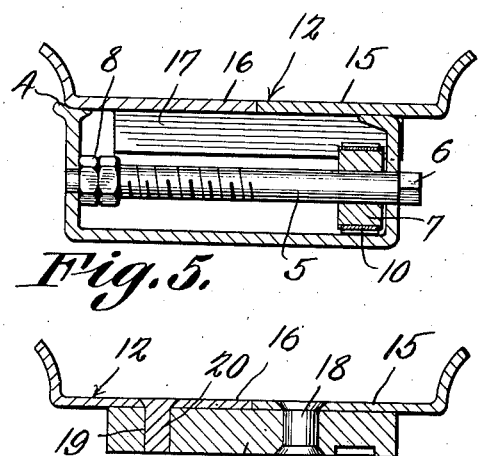
Fig. 5.
Fig. 6.
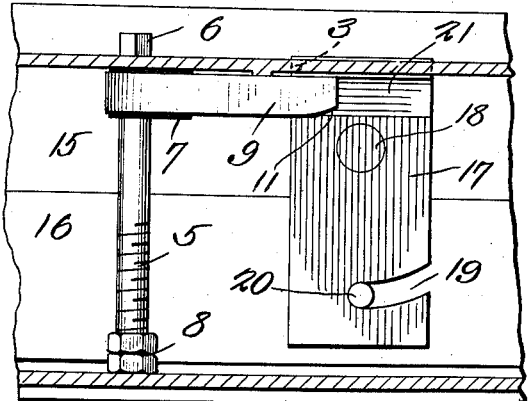
Fig. 7.
L. J. Jones  Inventor
By C. A. Snow & Co.
Attorneys.

Patented Aug. 3, 1926.

1,594,736

UNITED STATES PATENT OFFICE.

LEANDER J. JONES, OF HIGH POINT, NORTH CAROLINA.

AUTO WHEEL.

Application filed March 13, 1926. Serial No. 94,504.

This invention aims to provide novel means whereby a demountable rim and a tire casing carried thereby may be held on a wheel body.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:—

Figure 3 is a longitudinal section showing the parts as they will appear before they are locked together;

Figure 4 is a similar view showing the parts as they will appear after they are locked together;

Figure 5 is a section on the line 5—5 of Figure 4;

Figure 6 is a section on the line 6—6 of Figure 2;

Figure 7 is a sectional view illustrating the parts as they are when they are arranged as depicted in Figure 4.

Figure 1:
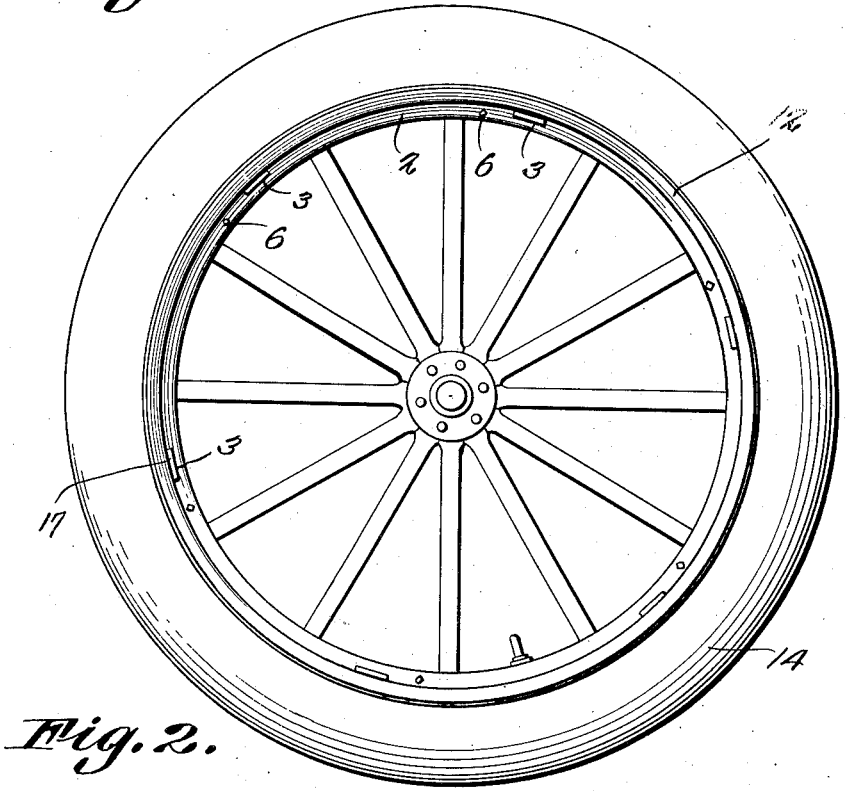
Figure 1 shows in elevation, an automobile wheel equipped with the device forming the subject matter of this application.
Figure 2:
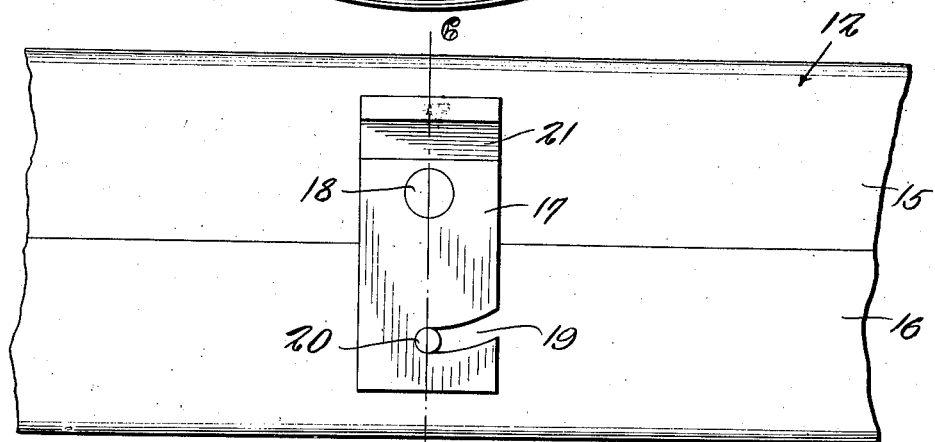
Figure 2 is an inner plan showing a portion of the demountable rim.

The numeral 1 marks a wheel including a trough-shaped body 2, one side flange of the body 2 having openings 3, and the other side flange of the body being provided with a circumferential shoulder 4, that is seen best in Figure 5. Shafts 5 are journaled in the side flanges of the body 2. The shafts 5 have squared external ends 6, whereunto a wrench, a key or the like may be applied. To each shaft 5, an eccentric 7 is secured. Nuts 8 are threaded on each shaft. The nuts 8 limit the longitudinal movement of the shaft 5 in one direction, and the eccentric 7 limits the longitudinal movement of the shaft 5 in an opposite direction, the parts specified cooperating with the flanges of the trough-shaped body to secure the result stated, an observation which will be understood readily when Figure 5 is examined. Latches 9 are mounted to slide on the base of the wheel body 2. The latches 9 have straps 10 engaged about the eccentrics 7. Each latch 9 is beveled at its free end, as shown at 11.

The numeral 12 marks a demountable rim carrying a tire body 14. The demountable rim 12 is made up of laterally separable sections 15 and 16. The rim 12 is supported on the side flanges of the body 2, as seen, for instance, in Figure 5. Retainers 17 are connected by pivot elements 18 to the rim section 15. There is one retainer 17 for each of the latches 9. The retainers 17 have slots 19 adapted to receive projections 20 on the rim section 16, to hold the sections 15 and 16 together. Each retainer 17 has a transverse seat or groove 21. The base of the seat or groove 21 is inclined circumferentially of the wheel, as shown at 22 in Figure 4.

The rim sections 15 and 16 are brought together, with the tire carcass 14 upon them. The retainers 17 are swung on the pivot elements 18, until the projections 20 are received in the slots 19. This operation holds the rim sections 15 and 16 together on the tire 14. The shafts 5 are turned, to operate the eccentrics 7 and to retract the latches 9 into the position shown in Figure 3. The demountable rim 12 then is slid transversely upon the wheel body 2, the retainers 17 passing into the openings 3 in one side of the wheel body 2, to prevent the demountable rim 12 from creeping on the wheel body, circumferentially of the wheel body. The shafts 5 then are rotated, to cause the eccentrics 7 to advance the latches 9 into the seats 21 of the retainers 17, as in Figures 4. Owing to the fact that the latches 9 are bevelled on one side as shown at 11, the rim 12 is crowded over against the shoulder 4 and is held tightly in place. The latches 9, when advanced into the seats 21 of the retainers 17 prevent the retainers from tilting on the pivot elements 18; and because the latches 9 are received in the seats 21, the demountable rim 12 cannot slide to the right in Figure 5, the shoulder 4 preventing the demountable rim from sliding to the left in that figure.

What is claimed is:—

1. In a device of the class described, a wheel body having openings, a demountable rim on the wheel body and provided with retainers received in the openings to prevent the rim from creeping circumferentially on the wheel body, the retainers having transverse seats, shafts journaled on the wheel body, eccentrics on the shafts, and latches engaged with the eccentrics, the shafts being rotatable to cause the latches to enter the seats of the retainers, and to prevent the demountable rim from moving transversely on the wheel body.

2. In a device of the class described, a wheel body, a demountable rim on the wheel body and supplied with retainers having seats which extend circumferentially of the wheel body, shafts journaled on the wheel body, eccentrics on the shafts, and latches cooperating with the eccentrics, the shafts being rotatable to cause the latches to enter the seats.

3. A device of the class described, constructed as set forth in claim 1, and further characterized by the fact that the retainers and the latches have mutually inclined parts which cooperate to move the rim transversely of the wheel body, when the latches are advanced, the wheel body having a shoulder against which the rim is pressed, when the rim is moved transversely of wheel body by the latches.

4. A device of the class described, constructed as set forth in claim 1, and further characterized by the fact that the rim is made up of laterally separable parts held together by the retainers.

In testimony that I claim the foregoing as my own, I have hereto affixed my signature.

LEANDER J. JONES.